June 30, 1942. C. E. HEITMAN, JR., ET AL 2,288,567
WELDING CONTROL
Filed March 22, 1939
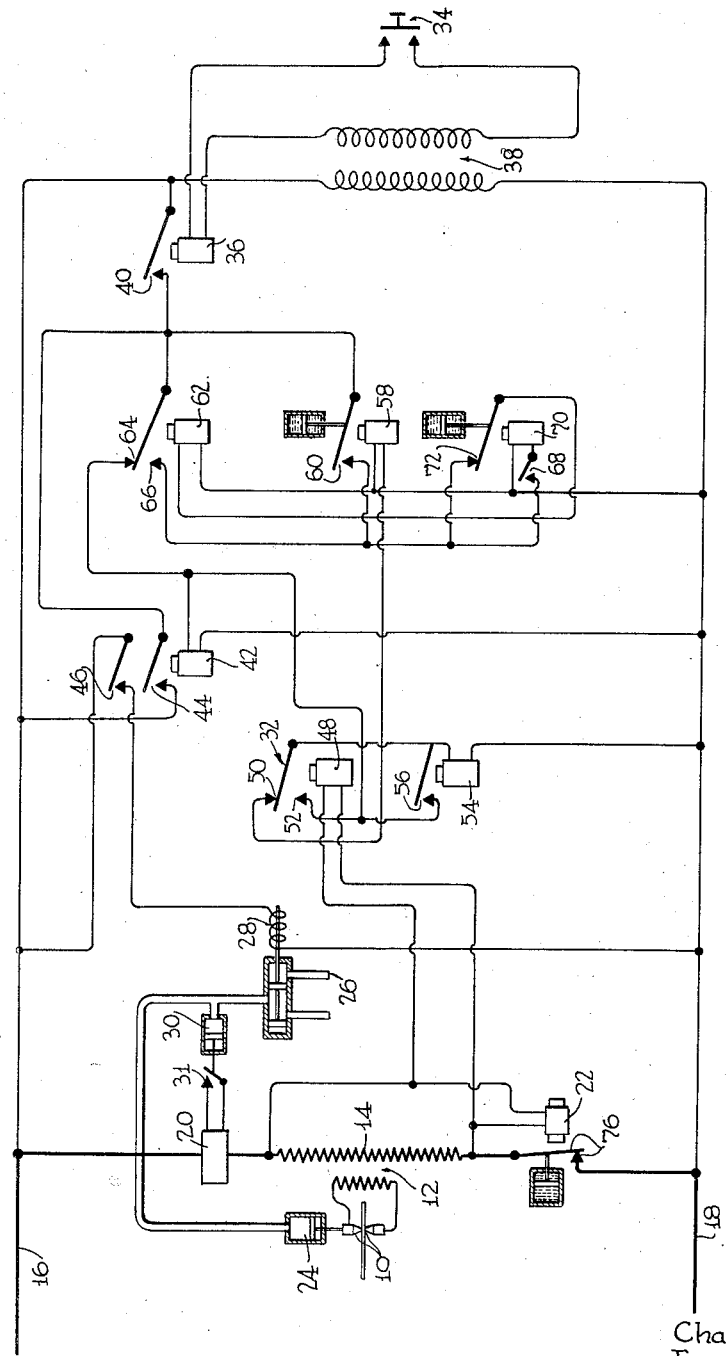
INVENTORS:
Charles E. Heitman Jr.
Frederic E. Laig
BY
ATTORNEY Patented June 30, 1942

2,288,567

UNITED STATES PATENT OFFICE 2,288,567

WELDING CONTROL

Charles E. Heitman, Jr., and Frederic E. Laig, Philadelphia, Pa., assignors to Edward G. Budd Manufacturing Company, Philadelphia, Pa., a corporation of Pennsylvania Application March 22, 1939, Serial No. 263,324

11 Claims. (Cl. 219—4)

This invention relates to a control for operating apparatus in sequence and is especially applicable to electric welding apparatus.

In electric spot welding, it is essential that the welding electrodes be engaged with the work to be welded, under pressure prior to the application of welding current, and to prevent burning and to provide for proper forging, the pressure must be maintained for a period after the welding current ceases to flow. This is known as the holding period. It is further essential that the electrodes be not separated from the work while the welding current is flowing, for under such circumstances, serious burning and arcing would result, leaving a hole in the work.

In welding circuits employing ignitrons or other mercury vapor triodes or the like for controlling the welding current, it often happens that the ignitron control fails to function to shut off the welding current so that timing control apparatus, heretofore employed, which relied upon the ignitron control as representative of the duration of time of flow of welding current, often permitted separation of the welding electrodes, while welding current was still flowing, due to the failure of the ignitron. Ordinarily, a time interval was provided for building up pressure after which the ignitron control or timer caused the flow of welding current for a predetermined period, after which the electrodes were held for a predetermined time. This last holding period has heretofore commenced with the initiation of the ignitron timer or control, and therefore independent of welding current flow, so that should the ignitron timer fail to cut off the flow of welding current, then upon the termination of the holding period, the welding electrodes would separate, with the welding current still applied.

It is preferable to maintain the electrodes in engagement with the work, no matter how much too long the welding current may flow rather than separate them while the current flows, and therefore to preclude separation of the electrodes during flow of welding current.

Under such circumstances the welding circuit can be opened by a heat responsive switch or circuit breaker before it has flowed a period long enough to seriously damage the work.

Accordingly, it is an object of the invention to provide a sequence control circuit for electric spot welding in which the holding period is precluded from commencing until the flow of welding current has terminated.

Another object of the invention is to provide a sequence control circuit in which the separation of the welding electrodes from the work is precluded while welding current flows.

A further object of the invention is to provide a sequence control circuit in which the separation of the welding electrodes is precluded while welding current flows and in which an overload circuit breaker is adapted to interrupt the flow of welding current after flowing for a predetermined time.

The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, reference being had for this purpose to the appended claims.

In the drawing, the single figure illustrates a preferred form of control circuit in accordance with the invention.

Referring to the circuit diagram, there will appear welding electrodes 10, having a welding current supply transformer 12 having a primary 14 connected across the power lines 16 and 18 through a welding timer 20 and a time delay circuit breaker 22. The welding electrodes are engaged with work pieces by a fluid pressure cylinder 24 deriving pressure from any suitable source 26 through an electro-magnetic control valve 28. A pressure operated switch 31, responsive to a suitable welding electrode tip pressure is adapted to "fire" or initiate the operation of the timer which thereupon causes a current to flow through the transformer 12. The timer is so arranged as to be adjustable as to time of flow of current to effect different welds and satisfy different welding conditions, and may be of any well known type such as those employing ignitrons, etc.

After the termination of flow of welding current, it is desirable to maintain the welding electrodes in contact with the work pieces and under pressure sufficient to forge the work pieces and the spot weld. It has been the practice heretofore to provide such a holding period commencing with the beginning of the welding time or control period for effecting the flow of welding current for the usual predetermined period, but due to the occasional failure of the welding timer to cut off the actual flow of welding current, it has often happened that the welding electrodes have been separated while the welding current was still flowing. In order to prevent this occurrence, the commencing of the holding period is made dependent upon the termination of the flow of welding current and this is accomplished through the use of a relay 48 and 32 energized by the voltage across the primary 14 of the welding transformer 12.

In order to understand the manner in which this relay cooperates with the control circuit, the remainder of the circuit will first be described. An operator's manual switch 34 is provided in conjunction with a relay 36 and a voltage reducing transformer 38 connected across the lines 16 and 18. The relay 36 upon being energized closes contacts 40 energizing relay 42. Upon the closing of contacts 44 of relay 42, the contacts 40 of relay 36 are shunted, and the circuit closed by the closing of contacts 40, is thereby held. As a result of energization of relay 42, contacts 46 are also closed completing a circuit between the lines 16 and 18 through the pressure valve operating solenoid 28, thereby admitting fluid presure to the electrode operating cylinder 24, thereby placing the welding electrodes under pressure. As soon as sufficient pressure is developed in the cylinder 24 and as a result of the electrodes contacting the work pieces, the pressure switch 31 is closed and the welding timer 20 caused to function, thus resulting in a welding current flowing for a predetermined time as desired. As soon as a welding current commences to flow, the winding 48 of relay 32 is energized opening contacts 50 and closing contacts 52 thereby energizing a holding relay 54 and closing contacts 56. So long as a welding current flows, the voltage is maintained across the coil 48 of relay 32, but as soon as the welding current ceases to flow the voltage across the coil 48 of relay 32 disappears thereby deenergizing the relay and closing contacts 50 thereby completing a circuit through contacts 56 and 50 to energize a timed delay relay 58. After a predetermined time the timed delay relay closes contacts 60 connected in circuit with relay 62 thereby energizing the relay and opening contacts 64 and closing contacts 66. Upon the opening of contacts 64, the relay 42 becomes deenergized opening contacts 44 and 46, deenergizing electro-magnetic valve 28 thereby exhausting the electrode operating cylinder 24 and separating the electrodes.

Should it be desired to repeat the weld or make a series of welds in rapid succession, a repeat switch 68 in circuit with a second timed delay relay 70 may be connected in circuit with contacts 66 of relay 62 and after a predetermined time the contacts 72 of relay 70 will be broken opening the circuit to the coil of relay 62 thereby opening contacts 66 and closing contacts 64. If the operator's switch 34 has been held depressed, immediately upon the closing of contacts 64 the cycle will be repeated.

The relay 32 should be of the non-chattering type and should be operative over a wide range of voltages since under some circumstances while welding current is flowing, the voltage across the primary of the transformer is subject to wide variations as occurs for example when one ignitron of the welding timer does not function resulting in a pulsating direct current flowing through the transformer. Under such circumstances the exciting current of the transformer becomes exceptionally great producing a high voltage drop and it is necessary that under such circumstances the relay 32 should hold. The relay should likewise be capable of holding over the space of time occurring between impulses since in effecting light welds the welding current as a result of the timer control consists of a series of spaced impulses, the interval between which no current flows. The relay, therefore, should hold at least over the time of one cycle.

In the event that the welding current does not cease before a predetermined time a relay 22 is provided for breaking the circuit through circuit breaking contacts 76, the relay being so adjusted as to not function within the time desired for welding.

The operation of the circuit will be readily understood from the foregoing description and is entirely automatic insofar as the operator is concerned. It automatically provides for a delay period during which pressure is built up upon the work pieces and which period depends upon the adjustment of the pressure switch. Thereafter a welding time interval occurs which is adjustable through manipulation of the welding timer 20 and as soon as the welding current ceases to flow, a holding period, during which time the pressure on the electrodes is not released, occurs, which holding time is likewise adjustable for any particular type of work. Where repeated welds are to be made the relay 70 is adjustable in order to assure a proper interval between welds to permit movement of the work pieces to a new position. Thus as soon as the operator's manual switch is closed energizing relay 36, holding relay 42 is immediately energized closing a circuit to the electro-magnetic fluid pressure valve 28. Upon the closure of the pressure switch 31 the welding transformer is energized by the welding timer and the magnet 48 of relay 32 is energized and is not deenergized until the welding current ceases to flow. Energizing relay 48 and 32, in turn energizes relay 54 which is maintained energized after deenergization of relay 48 and 32 by reason of the closing of contacts 56. Upon deenergization of relay 48 and 32 a circuit is completed through relay 54 and holding time relay 58 which, in a predetermined time, closes its contacts 60 energizing relay 62 and breaking the circuit to relay 42, opening contacts 44. Thereupon contacts 44 of relay 42 are opened, breaking the circuits to relay 62 and 58, provided the operator's manual switch is open and the relay coil 36 deenergized.

It will appear that the circuit described precludes the opening of the welding electrodes so long as a welding current flows and also precludes the opening of the welding electrodes until after the holding time relay 58 has acted and thus there is always assured a predetermined holding time upon the welding electrodes after the welding current has ceased to flow. Should, for any reason, the welding current continue to flow through improper operation of the times, it is impossible for the operator to open the welding electrodes while the welding current is flowing as would likely occur were it not for the circuit described since under such circumstances the excitement of an operator would ordinarily cause him to separate the welding electrodes while the welding current flowed. Since there is provided a time controlled circuit breaker relay 22 should the welding current flow for too long a time, the circuit to the welding transformer will be interrupted and thereby automatically cause the operation of the relays 48 and 32, the relays 58 and 62 just as occurs normally upon the termination of the flow of current through the welding transformer 12. Since it is usual in spot welding to provide a great number of spot welds on a work piece, it will readily appear that such a control will prevent the burning of holes in the work pieces which otherwise might ruin an expensive fabricated structure.

Though only one circuit has been illustrated and described, it is to be understood that the invention is not limited thereto but may be embodied in various equivalent circuits for performing the same result. As various changes in operation and arrangement of the parts may be made without departing from the spirit of the invention as will be apparent to persons skilled in the art, reference will be had to the appended claims for a definition of the limits of the invention.

What we claim is:

1. In a timer control for an electric welding circuit, means for effecting engagement under pressure of a pair of welding electrodes with work pieces, means responsive to the engagement of said electrodes under pressure and including a timer control for energizing said electrodes with a welding current for a welding period, and means independent of said timer control responsive to the flow of welding current for positively maintaining said electrodes in engagement with said work piece a predetermined time through said pressure engaging means, after the termination of flow of said welding current, said last mentioned means including a time delay relay actuated only after and not before the termination of welding current flow.

2. In a timer control for an electric welding circuit, means for effecting engagement of a pair of welding electrodes under pressure with work pieces, means responsive to the engagement of said electrodes under pressure and including a timer control for energizing said electrodes with a welding current, and means independent of said timer control, responsive to the flow of welding current for maintaining said pressure engaging means positively and fully operative until after termination of flow of said welding current, said last mentioned means including a time delay relay originally put into operation in response to cessation of welding current for determining the length of the holding period during which the electrodes engage the work under pressure after the welding operation.

3. In a timer control for an electric welding circuit, means for effecting engagement of a pair of welding electrodes under pressure with work pieces, means only operative subsequent to the engagement of said electrodes under pressure and including a timer control for energizing said electrodes with a welding current, and means at all times independent of said timer control, and responsive to the flow of welding current, for maintaining said pressure engaging means positively and fully operating until after a predetermined period after termination of flow of said welding current.

4. In a timer control for an electric welding circuit, means for effecting engagement under pressure of a pair of welding electrodes with work pieces including a timer control, and for causing a welding current to flow through said electrodes, and means at all times independent of said timer control responsive to the flow of welding current for positively maintaining the said welding electrodes under said pressure during the flow of welding current.

5. In a timer control for an electric welding circuit, means for effecting engagement under pressure of a pair of welding electrodes with work pieces, means responsive to the engagement of said electrodes under pressure for energizing said electrodes with a welding current for a normal welding period, means responsive to the flow of welding current for positively maintaining said electrodes in engagement with said work piece a predetermined time after the termination of flow of said welding current, and time controlled means for interrupting said welding current flow after a predetermined current flow time in excess of the normal welding period.

6. In an electric welding circuit, welding electrodes and means for effecting engagement thereof with work pieces under a predetermined pressure, a welding transformer, a timer in circuit with said transformer for effecting a flow of welding current for a welding period through said electrodes, and means at all times independent of the timer and responsive to and operative during the flow of welding current for positively maintaining the engagement of the welding electrodes under said predetermined pressure.

7. In an electric welding circuit, welding electrodes and means for effecting engagement thereof with work pieces under a predetermined pressure, a welding transformer, a timer in circuit with said transformer for effecting a flow of welding current for a welding period through said electrodes, means independent of the timer and responsive to and operative during the flow of welding current and for a predetermined time after the termination of flow of welding current for positively maintaining the engagement of the welding electrodes during said flow and said predetermined time and under said predetermined pressure, and time delay means for opening the welding circuit in event of failure of the timer after a set time longer than the normal welding period.

8. A welding apparatus including a welding electrode, means for pressing said electrode against the work, means for supplying welding current to said electrode, timing means for said welding current, means for locking said electrode against being prematurely removed from the work, a time delay means for unlocking said electrode and separating it from the work, and means responsive to termination of the flow of welding current for originating actuation of said time delay means.

9. A welding apparatus including a welding electrode, means for pressing said electrode against the work, means for supplying welding current to said electrode, timing means for said welding current, means for locking said electrode against being prematurely removed from the work, a time delay means for unlocking said electrode and separating it from the work, electromagnetic means responsive to termination of the flow of welding current for originating actuation of said time delay means, and another delay action means for controlling the time said electrode is separated from the work.

10. A welding apparatus including a welding electrode, means for pressing said electrode against the work, means for supplying welding current to said electrode, timing means for said welding current, means for locking said electrode against being prematurely removed from the work, a time delay means for unlocking said electrode and separating it from the work, and means responsive to termination of the flow of welding current for originating actuation of said time delay means, and a time delay responsive circuit-breaker for interrupting the welding current after a predetermined and excessive time.

11. A welding apparatus including a welding electrode, means for pressing said electrode against the work, means for supplying welding current to said electrode, timing means for the welding current, means for maintaining the electrode against being prematurely separated from the work, a time delay means for controlling the length of time said electrode is held against the work after termination of welding current flow, means responsive to termination of the flow of welding current for originating actuation of said time delay means, said means responsive to termination of welding current flow including a relay and switch part actuated thereby, responsive to initiation and termination of welding current, which switch part is of a nonchattering type, adapted to hold its switch part for at least as long as one cycle of welding current and with a wide range of voltages over and under normal welding voltage.

CHARLES E. HEITMAN, Jr.
FREDERIC E. LAIG.